(12) United States Patent
Hosokawa et al.

(10) Patent No.: US 9,523,395 B2
(45) Date of Patent: Dec. 20, 2016

(54) DRIVING FORCE TRANSMISSION DEVICE

(71) Applicant: JTEKT CORPORATION, Osaka-shi (JP)

(72) Inventors: Takashi Hosokawa, Takahama (JP);
Noriyuki Fujii, Hekinan (JP);
Kunihiko Suzuki, Gamagori (JP);
Hiroshi Takuno, Nukata-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 46 days.

(21) Appl. No.: 14/719,843

(22) Filed: May 22, 2015

(65) Prior Publication Data
US 2015/0345566 A1    Dec. 3, 2015

(30) Foreign Application Priority Data

May 27, 2014    (JP) ................. 2014-109390

(51) Int. Cl.
*F16D 23/04*    (2006.01)
*F16D 27/11*    (2006.01)
(Continued)

(52) U.S. Cl.
CPC ............... *F16D 23/04* (2013.01); *F16D 27/11* (2013.01); *F16D 27/118* (2013.01); *F16D 2023/0687* (2013.01)

(58) Field of Classification Search
CPC .. F16D 23/06; F16D 23/04; F16D 2023/0687; F16D 27/11; F16D 27/14; F16D 27/118; F16D 27/09
See application file for complete search history.

(56) References Cited

U.S. PATENT DOCUMENTS

| | | | |
|---|---|---|---|
| 2012/0222933 A1* | 9/2012 | Abousleiman | F16D 25/061 192/69.5 |
| 2015/0068862 A1* | 3/2015 | Fujii | F16D 11/14 192/84.9 |

(Continued)

FOREIGN PATENT DOCUMENTS

WO    WO 2005/106272 A1    11/2005

OTHER PUBLICATIONS

U.S. Appl. No. 14/719,860, filed May 22, 2015, Hosokawa, et al.

*Primary Examiner* — Richard Lorence
*Assistant Examiner* — David Morris
(74) *Attorney, Agent, or Firm* — Oblon, McClelland, Maier & Neustadt, L.L.P.

(57) ABSTRACT

A driving force transmission device includes: a switch member that switches a first rotary member and a second rotary member between a coupled state and a decoupled state; a second friction member that generates a frictional force between the rotary members; a piston member that has first to sixth engaged portions formed in the shape of a staircase and that presses the switch member and the second friction member in an axial direction; a biasing mechanism that presses the switch member and the second friction member toward the piston member; and an engaging member that engages with one of the plurality of engaged portions. The engaging member rotates the piston member by sliding on a plurality of tilted surfaces of the plurality of engaged portions, and the piston member is always pressed toward the engaging member by a biasing force of the biasing mechanism.

3 Claims, 8 Drawing Sheets

(51) Int. Cl.
*F16D 27/118* (2006.01)
*F16D 23/06* (2006.01)

(56) References Cited

U.S. PATENT DOCUMENTS

2015/0260239 A1* 9/2015 Hayakawa ............ F16D 27/118
                                                    192/84.1
2015/0345572 A1* 12/2015 Hosokawa .............. F16D 27/14
                                                    192/101

* cited by examiner

DRIVING FORCE TRANSMISSION DEVICE

INCORPORATION BY REFERENCE

The disclosure of Japanese Patent Application No. 2014-109390 filed on May 27, 2014 including the specification, drawings and abstract, is incorporated herein by reference in its entirety.

BACKGROUND OF THE INVENTION

1. Field of the Invention

The present invention relates to driving force transmission devices that transmit a driving force between rotary members.

2. Description of the Related Art

Conventionally, driving force transmission devices are known in the art which are used for, e.g., driving force transmission systems for vehicles and which are capable of permitting and cutting off transmission of a driving force between rotary members. See, e.g., International Patent Publication No. 2005/106272 WO (2005/106272).

A clutch device described in WO 2005/106272 is used for transmissions for vehicles, and includes: first friction discs that spline engage with the outer peripheral surface of a shaft-like clutch hub; second friction discs that spline engage with a cylindrical clutch drum; an electric motor that generates power pressing the first and second friction discs against each other; and a lock mechanism that maintains the pressing force for the first and second friction discs in the state where current supply to the electric motor is cut off. The power of the electric motor is reduced in speed by a speed reduction mechanism and is converted to linear motion by a cam mechanism to operate the lock mechanism.

The second embodiment (see FIG. 11) of WO 2005/106272 describes that a cylindrical latch mechanism can be used as the lock mechanism. This latch mechanism has: a first inner cylinder having a switch slope; an outer cylinder in which shallow and deep grooves as positioning grooves are alternately arranged in the circumferential direction; and a second inner cylinder having a moving pin. The latch mechanism can switch between a locked state where the moving pin is held in the shallow grooves and an unlocked state where the moving pin is held in the deep grooves, by moving the moving pin of the second inner cylinder between the shallow and deep grooves of the outer cylinder by the switch slope of the first inner cylinder.

Tilted surfaces tilted with respect to the circumferential direction are formed on the axial end faces of the first inner cylinder and the outer cylinder. The moving pin of the second inner cylinder moves between the shallow and deep grooves by sliding on these tilted surfaces. When the moving pin moves into the shallow grooves, the second inner cylinder presses the first and second friction discs against each other. When the moving pin moves into the deep grooves, the second inner cylinder does not press the first and second friction discs against each other.

In the clutch device described in WO 2005/106272, the moving pin of the second inner cylinder slides on the tilted surfaces formed on the axial end faces of the first inner cylinder and the outer cylinder. The second inner cylinder therefore needs to be subjected to a pressing force in the axial direction from a clutch formed by the first friction discs and the second friction discs. If this pressing force is not applied, operation of the lock mechanism may not be reliably performed.

SUMMARY OF THE INVENTION

It is one object of the present invention to provide a driving force transmission device capable of reliably switching between a coupled state and a decoupled state of rotary members.

A driving force transmission device according to an aspect of the present invention includes: a first rotary member and a second rotary member which can rotate relative to each other; a switch member that can switch the first rotary member and the second rotary member between a coupled state and a decoupled state by moving in an axial direction; a friction member that generates a frictional force suppressing differential rotation between the first and second rotary members, by moving in the axial direction; a cylindrical piston member that has a plurality of engaged portions formed in a shape of a staircase in a circumferential direction, and that can press the switch member and the friction member toward one side in the axial direction; a pressing member that is disposed so as to face the engaged portions of the piston member in the axial direction, and that advances and withdraws between a first position where the pressing member presses the piston member in the axial direction and a second position where the pressing member does not press the piston member; a biasing mechanism that presses the switch member and the friction member toward the piston member; and an engaging member that engages with one of the plurality of engaged portions. The engaged portions of the piston member have a tilted surface tilted with respect to the circumferential direction of the piston member. By moving to the first position, the pressing member presses the tilted surface of the engaged portion and rotates the piston member by a predetermined amount to cause a tilted surface of another one of the engaged portions which adjoins the engaged portion to face the engaging member. When the pressing member returns to the second position, the tilted surface of the another engaged portion slides on the engaging member due to a biasing force of the biasing mechanism, and the piston member thus further rotates, whereby the engaging member engages with the another engaged portion. The piston member is always pressed toward the engaging member by the biasing force of the biasing mechanism.

The driving force transmission device of the above aspect can reliably switch between the coupled state and the decoupled state of the rotary members.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described below with reference to the accompanying drawings.

Figure 1:
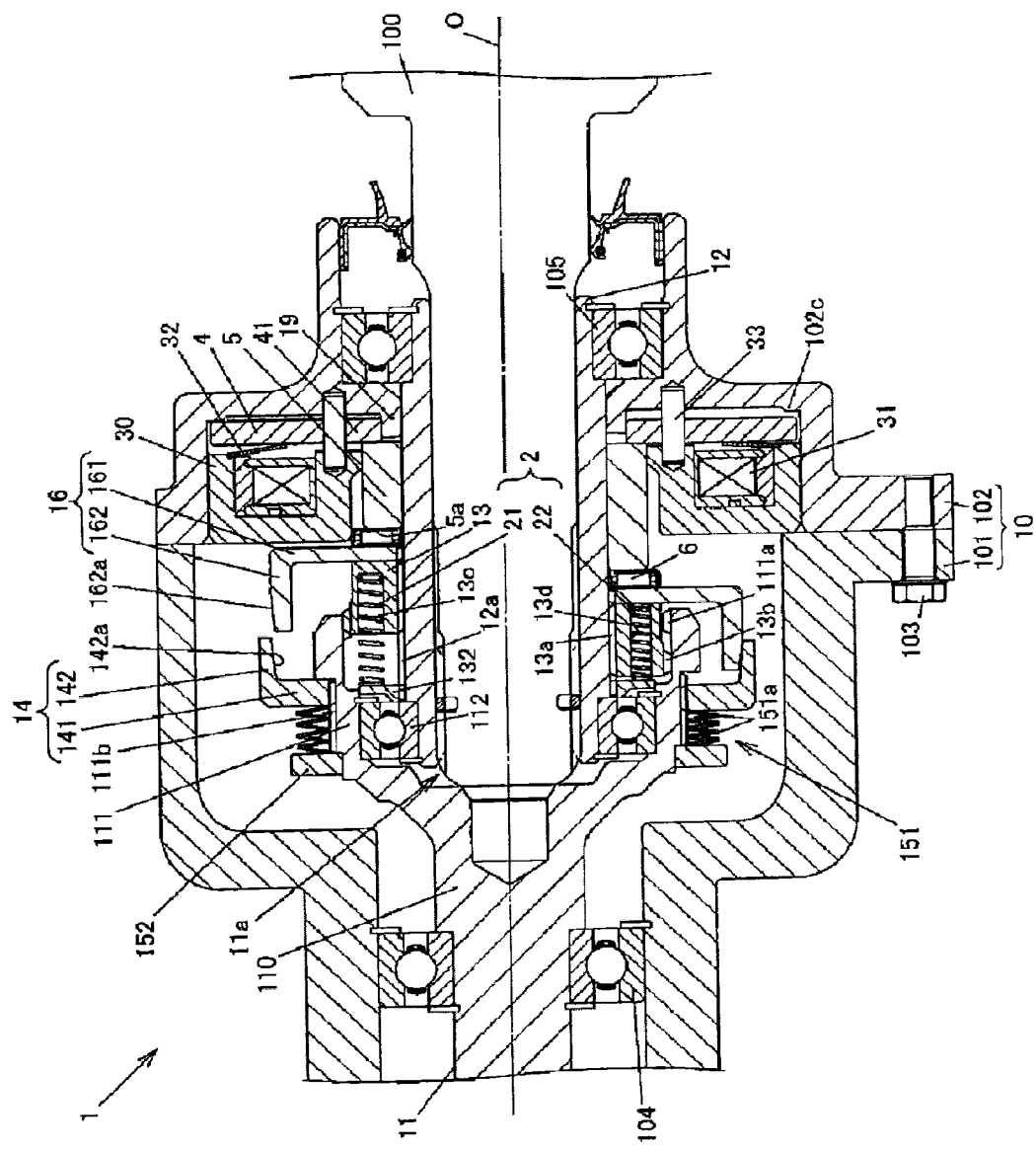
FIG. 1 is a sectional view of a driving force transmission device according to an embodiment of the present invention.

FIG. 1 is a sectional view of a driving force transmission device according to an embodiment of the present invention. This driving force transmission device is used to transmit a driving force of a driving source, such as for moving a vehicle, and can permit and cut off the transmission of the driving force.

A driving force transmission device 1 can switch between a coupled state where a first rotary member 11 and a second rotary member 12 are coupled so that a driving force can be transmitted therebetween and a decoupled state where transmission of the driving force between the first and second rotary members 11, 12 is cut off. In FIG. 1, the coupled state is shown in the region above a rotational axis O, and the decoupled state is shown in the portion below the rotational axis O. Hereinafter, a direction parallel to the rotational axis O is sometimes simply referred to as the "axial direction."

The driving force transmission device 1 includes the first rotary member 11, the second rotary member 12, a switch member 13, a first friction member 14, a second friction member 16, a piston member 5, an armature 4, a biasing mechanism 2, and a plurality of engaging members 19. The first and second rotary members 11, 12 are accommodated in a housing 10 and can rotate relative to each other. The switch member 13 can switch the first and second rotary members 11, 12 between the coupled state and the decoupled state by moving in the axial direction. The first and second friction members 14, 16 generate a frictional force to suppress differential rotation between the first and second rotary members 11, 12. The piston member 5 can press the switch member 13 and the second friction member 16 toward one side in the axial direction. The armature 4 serves as a pressing member that presses the piston member 5 in the axial direction. The biasing mechanism 2 presses the switch member 13 toward the piston member 5. The engaging members 19 engage with the piston member 5. The second friction member 16 is one form of a friction member of the present invention.

The housing 10 is formed by a first housing member 101 and a second housing member 102. The first and second housing members 101, 102 are coupled by a bolt 103.

The first rotary member 11 is integrally formed by a shaft portion 110 and a cylinder portion 111. The shaft portion 110 is rotatably supported in the housing 10 by a ball bearing 104. The cylinder portion 111 is provided at a second housing member 102-side end of the shaft portion 110. The cylinder portion 111 has a cylindrical shape and has an accommodating space 11a formed therein. The cylinder portion 111 has a larger outside diameter than the shaft portion 110. The accommodating space 11a opens at its end on the opposite side from the shaft portion 110. The first rotary member 11 has a plurality of inner peripheral spline protrusions 111a on the inner periphery of the cylinder portion 111.

The second rotary member 12 has a cylindrical shape, and one end of the second rotary member 12 is accommodated in the accommodating space 11a. A shaft 100 is inserted in the second rotary member 12. The second rotary member 12 is spline fitted on the shaft 100 and rotates together with the shaft 100. A ball bearing 112 is disposed between the outer peripheral surface of the second rotary member 12 and the inner peripheral surface of the cylinder portion 111 in the accommodating space 11a. A ball bearing 105 is disposed between the outer peripheral surface of the end on the opposite side of the second rotary member 12 from the cylinder portion 111 and the inner surface of the housing 10. The second rotary member 12 has a plurality of spline protrusions 12a formed on its outer peripheral surface so as to extend in the axial direction, so that the switch member 13 having a cylindrical shape is fitted on the second rotary member 12.

Figure 2:
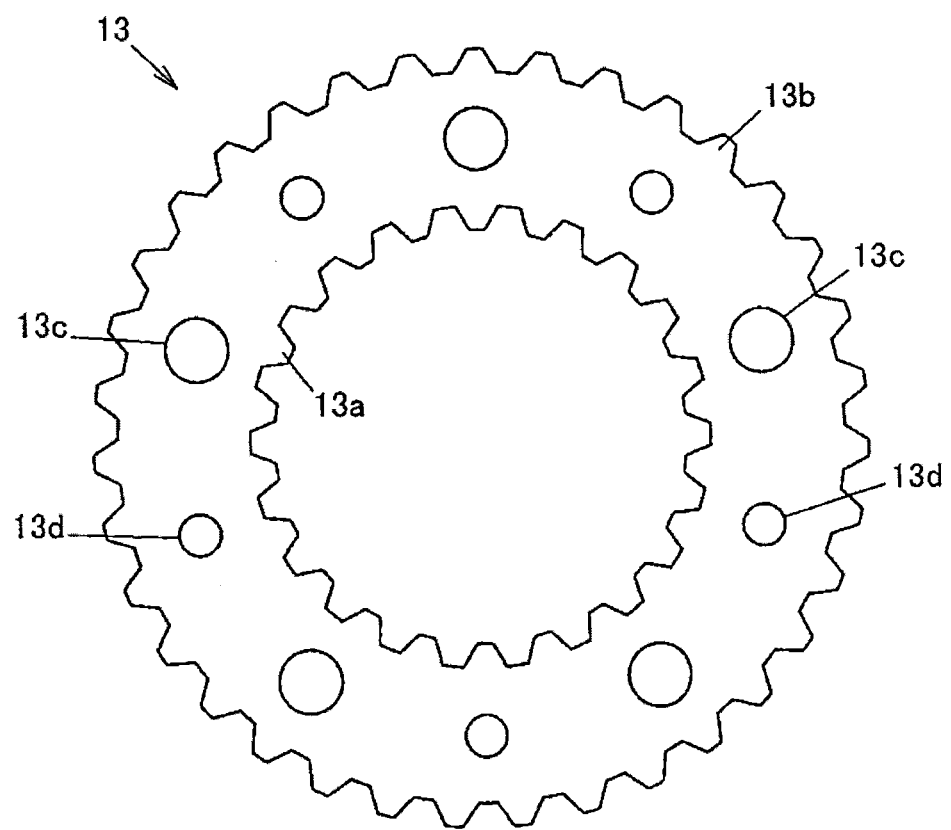
FIG. 2 is a plan view of a switch member as viewed from the opposite side from an armature.

FIG. 2 is a plan view of the switch member 13 as viewed along the rotational axis O from the opposite side from the armature 4.

The switch member 13 is a cylindrical member having the second rotary member 12 inserted through the center thereof, and is disposed such that a part of the second friction member 16 is interposed between the switch member 13 and the piston member 5 along the rotational axis O. The switch member 13 has a plurality of inner peripheral spline protrusions 13a on its inner peripheral surface, so that the switch member 13 is spline fitted on the second rotary member 12 via the inner peripheral spline protrusions 13a and the spline protrusions 12a. The switch member 13 is therefore not allowed to rotate relative to the second rotary member 12 and is allowed to move in the axial direction relative to the second rotary member 12.

The switch member 13 has a plurality of accommodating holes 13c and a plurality of insertion holes 13d. The accommodating holes 13c extend along the rotational axis O and open on the first rotary member 11 side. The insertion holes 13d extend along the rotational axis O and have a smaller diameter than the accommodating holes 13c. The accommodating holes 13c and the insertion holes 13d are alternately formed at regular intervals in the circumferential direction of the switch member 13. One ends of first spring members 21 are accommodated in the respective accommodating holes 13c, and one ends of second spring members 22 are inserted through the respective insertion holes 13d. The first spring members 21 and the second spring members 22 will be described later.

The accommodating holes 13c and the insertion holes 13d open on the opposite side from the piston member 5. The insertion holes 13d open on the piston member 5 side as well and extend through the switch member 13 in the axial direction. The accommodating holes 13c do not open on the piston member 5 side. The accommodating spaces of the accommodating holes 13c thus have a bottomed cylindrical shape.

The other ends of the first and second spring members 21, 22 contact a receiving member 132 engaged with the spline protrusions 12a of the second rotary member 12. The receiving member 132 contacts an inner ring of the ball bearing 112, whereby axial movement of the receiving member 132 in a direction away from the piston member 5 is restricted. The receiving member 132 is thus not allowed to rotate relative to the second rotary member 12, and axial movement of the receiving member 132 relative to the second rotary member 12 is restricted.

The switch member 13 has a plurality of outer peripheral spline protrusions 13b formed on its outer periphery so as to extend in the axial direction. The outer peripheral spline protrusions 13b extend along a shorter axial length than the inner peripheral spline protrusions 13a. That is, the inner peripheral spline protrusions 13a extend along the entire axial length of the inner peripheral surface of the switch member 13, whereas the outer peripheral spline protrusions 13b extend along the axial length of a receiving member 132-side part of the outer peripheral surface of the switch member 13.

The outer peripheral spline protrusions 13b of the switch member 13 are engaged with the inner peripheral spline protrusions 111a of the first rotary member 11 when the switch member 13 moves to a position away from the receiving member 132, and are disengaged from the inner peripheral spline protrusions 111a of the first rotary member 11 when the switch member 13 moves to a position close to the receiving member 132. When the outer peripheral spline protrusions 13b of the switch member 13 are engaged with the inner peripheral spline protrusions 111a of the first rotary member 11, the first and second rotary members 11, 12 are coupled so as not to be able to rotate relative to each other. In FIG. 1, the state where the outer peripheral spline protrusions 13b of the switch member 13 are engaged with the inner peripheral spline protrusions 111a of the first rotary member 11 is shown in the region above the rotational axis O, and the state where the outer peripheral spline protrusions 13b of the switch member 13 are disengaged with the inner peripheral spline protrusions 111a of the first rotary member 11 is shown in the region below the rotational axis O.

The first friction member 14 having an annular shape is fitted on the outer periphery of the cylinder portion 111 of the first rotary member 11. The first friction member 14 is integrally formed by a disc-shaped body portion 141 and a rib portion 142. The rib portion 142 protrudes in the axial direction from the outer peripheral end of the body portion 141. The inner peripheral end of the body portion 141 is engaged with a plurality of spline protrusions 111b formed on the outer peripheral surface of the cylinder portion 111. The first friction member 14 is thus not allowed to rotate relative to the first rotary member 11 and is allowed to move in the axial direction relative to the first rotary member 11. The rib portion 142 has a tapered shape in section along the axial direction. That is, an inner peripheral surface 142a of the rib portion 142 is tilted so that the inside diameter of the rib portion 142 increases toward the distal axial end of the rib portion 142.

The first friction member 14 is biased to the opposite side from the shaft portion 110 of the first rotary member 11 by an elastic member 151, and contacts a stepped portion of the cylinder portion 111, whereby axial movement of the first friction member 14 toward the distal end of the cylinder portion 111 is restricted. The elastic member 151 is formed by a plurality of coned disc springs 151a arranged in the axial direction, and is disposed in an axially compressed state between the first friction member 14 and an annular body 152 fixed to the cylinder portion 111.

The first friction member 14 frictionally slides on the second friction member 16 disposed so as not to be allowed to rotate relative to the second rotary member 12 and so as to be allowed to move in the axial direction relative to the second rotary member 12. The first friction member 14 thus transmits a rotational force between the first rotary member 11 and the second rotary member 12.

The second friction member 16 is integrally formed by a disc-shaped body portion 161 and a rib portion 162. The rib portion 162 protrudes in the axial direction from the outer peripheral end of the body portion 161. The inner peripheral end of the body portion 161 is interposed between the switch member 13 and the piston member 5, and is engaged with the plurality of spline protrusions 12a formed on the outer peripheral surface of the second rotary member 12. The second friction member 16 is thus not allowed to rotate relative to the second rotary member 12 and is allowed to move in the axial direction relative to the second rotary member 12. The rib portion 162 has a tapered shape in section along the axial direction. That is, an outer peripheral surface 162a of the rib portion 162 is tilted so that the outside diameter of the rib portion 162 decreases toward the distal axial end of the rib portion 162.

A side surface of the body portion 161 of the second friction member 16 contacts the switch member 13 in the axial direction. The one ends of the second spring members 22 fitted through the insertion holes 13d of the switch member 13 contact the body portion 161 of the second friction member 16. The second friction member 16 is therefore always subjected to a biasing force applied by the second spring members 22 in the axial direction toward the piston member 5.

When the second friction member 16 moves toward the first friction member 14, the outer peripheral surface 162a of the rib portion 162 surface contacts the inner peripheral surface 142a of the rib portion 142 of the first friction member 14. At this time, the elastic member 151 biasing the first friction member 14 toward the second friction member 16 is compressed, and the first friction member 14 is pressed toward the second friction member 16 by a restoring force of the elastic member 151. The inner peripheral surface 142a of the rib portion 142 of the first friction member 14 thus frictionally contacts the outer peripheral surface 162a of the rib portion 162 of the second friction member 16. This frictional contact suppresses differential rotation between the first and second rotary members 11, 12.

The biasing mechanism 2 has the first spring members 21 and the second spring members 22. The first spring members 21 bias the switch member 13 in the axial direction toward the piston member 5, and the second spring members 22 bias the second friction member 16 in the axial direction toward the piston member 5. In the present embodiment, the biasing mechanism 2 has the plurality of (five) first spring members 21 and the plurality of (five) second spring members 22. In the present embodiment, each of the first spring members 21 and the second spring members 22 is formed by a coil spring, and is disposed so as to be compressed and extended in a direction parallel to the rotational axis O. The first spring members 21 and the second spring members 22 do not need to be the coil springs. For example, each of the first spring members 21 and the second spring members 22 may be a combination of a plurality of coned disc springs.

The one ends of the first spring members 21 are accommodated in the accommodating holes 13c of the switch member 13, and the other ends of the first spring members 21 contact the receiving member 132. The first spring members 21 thus always bias the switch member 13 in a direction away from the receiving member 132.

The second spring members 22 are fitted through the insertion holes 13d extending through the switch member 13 in the axial direction. The one ends of the second spring members 22 contact the second friction member 16, and the other ends of the second spring member 22 contact the receiving member 132. The second spring members 22 thus always bias the second friction member 16 in the direction away from the receiving member 132.

The configuration and operation of the piston member 5, the armature 4, and the engaging members 19 will be described with reference to FIGS. 3A to 7.

Figure 3A:
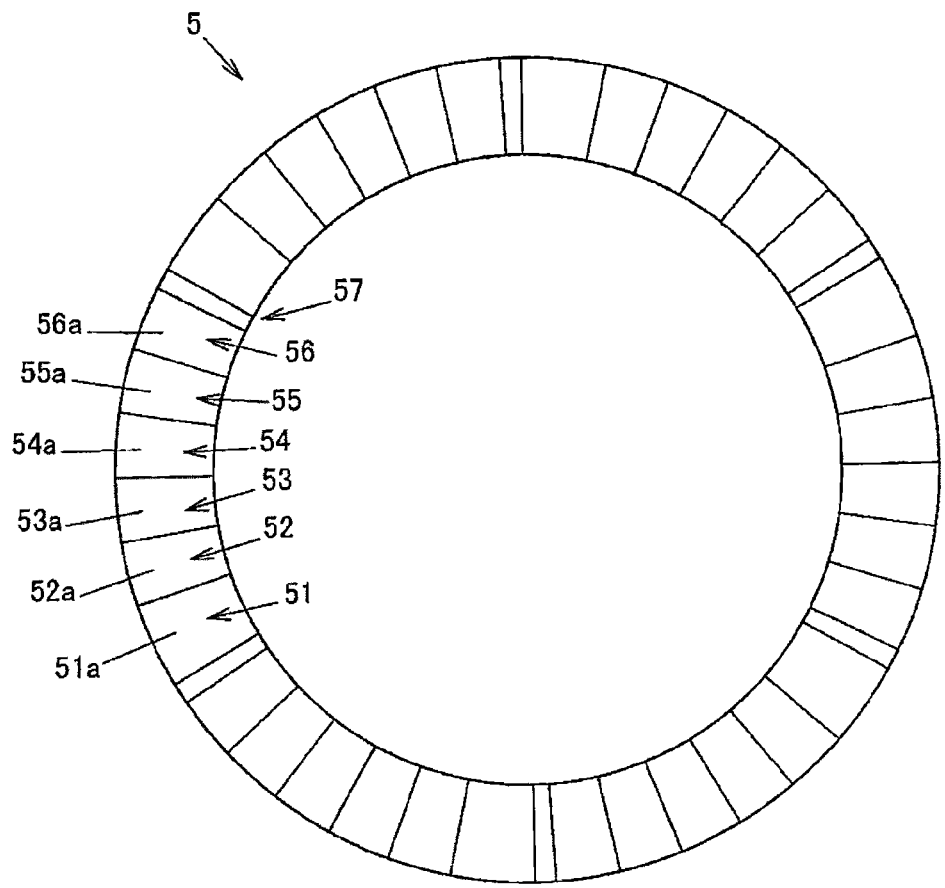
FIG. 3A is a plan view of a piston member as viewed from the armature side.
Figure 3B:
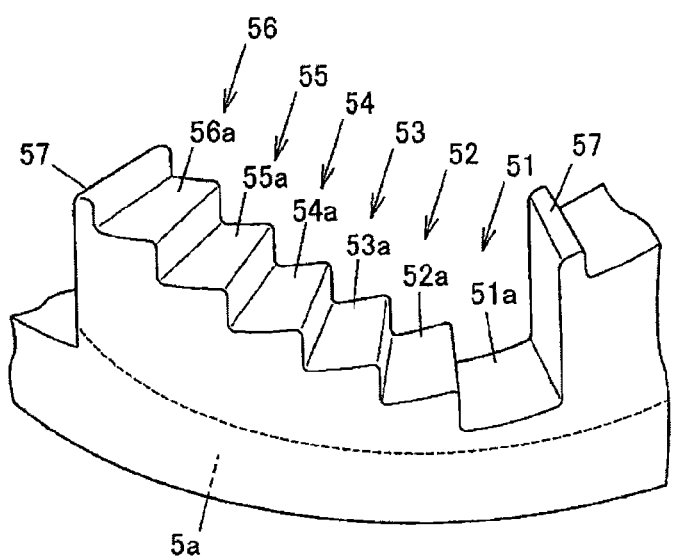
FIG. 3B is a partial perspective view of the piston member.

FIG. 3A is a plan view of the piston member 5 as viewed along the rotational axis O from the armature 4 side. FIG. 3B is a partial perspective view of the piston member 5.

The piston member 5 is an annular member fitted on the second rotary member 12, and a base end face 5a on the second friction member 16 side of the piston member 5 is a flat surface. A needle roller bearing 6 (shown in FIG. 1) is disposed between the base end face 5a and the second friction member 16. The base end face 5a is an annular flat surface perpendicular to the axial direction of the piston member 5.

The piston member 5 has six engaged portions (first to sixth engaged portions 51 to 56) having different heights from the base end face 5a, and a wall portion 57 adjoining the sixth engaged portion 56 in the circumferential direction of the piston member 5. The first to sixth engaged portions 51 to 56 and the wall portion 57 are formed in the shape of a staircase in the circumferential direction. In the present embodiment, the piston member 5 has six sets of the first to sixth engaged portions 51 to 56 and the wall portion 57. The end faces in the axial direction of the first to sixth engaged portions 51 to 56 which face toward the armature 4 along the rotational axis O are tilted surfaces 51a to 56a tilted with respect to the circumferential direction of the piston member 5. Each of the tilted surfaces 51a to 56a of the first to sixth engaged portions 51 to 56 of the piston member 5 is tilted so that the axial distance to the base end face 5a decreases toward the wall portion 57.

Figure 4:
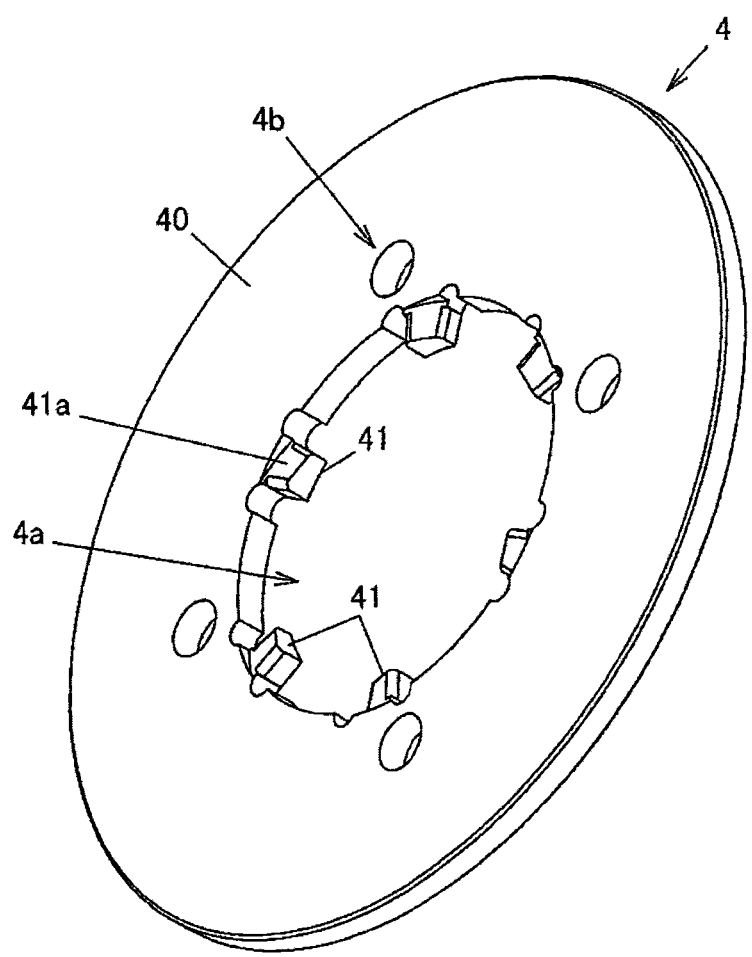
FIG. 4 is a perspective view of the armature.

FIG. 4 is a perspective view of the armature 4. The armature 4 is integrally formed by a body 40 and a plurality of (in the present embodiment, six) pressing protrusions 41. The body 40 has the shape of an annular disc with a through hole 4a formed in its center so that the second rotary member 12 is inserted therethrough. The pressing protrusions 41 protrude from the inner peripheral surface that defines the through hole 4a toward the center of the body 40. The armature 4 is disposed such that the pressing protrusion 41 face the first to sixth engaged portions 51 to 56 of the piston member 5 in the axial direction.

The body 40 of the armature 4 has four pin insertion holes 4b around the through hole 4a so that a plurality of pins 33 (shown in FIG. 1) are inserted therethrough. Facing surfaces 41a of the pressing protrusions 41 which face the tilted surfaces 51a to 56a of the first to sixth engaged portions 51 to 56 of the piston member 5 are tilted surfaces tilted with respect to the thickness direction of the body 40 (the direction parallel to the rotational axis O).

An electromagnetic coil 31 is supplied with a coil current from a controller, not shown. When the current is applied to the electromagnetic coil 31, the armature 4 is attracted toward the electromagnetic coil 31 by a magnetic force of the electromagnetic coil 31 to press the piston member 5 in the axial direction. The electromagnetic coil 31 is held in an annular yoke 30. A coned disc spring 32 is disposed between the yoke 30 and the armature 4. The coned disc spring 32 biases the armature 4 in such a direction that the armature 4 is separated from the electromagnetic coil 31 and the yoke 30. When the application of the current to the electromagnetic coil 31 is cut off, the armature 4 is separated from the electromagnetic coil 31 and the yoke 30 by the biasing force of the coned disc spring 32.

When no current is applied to the electromagnetic coil 31, the armature 4 contacts a receiving portion 102c of the second housing member 102 by the pressing force of the coned disc spring 32. When the application of the current to the electromagnetic coil 31 is resumed, the armature 4 is attracted toward the yoke 30 by the magnetic force of the electromagnetic coil 31 to press the piston member 5. Hereinafter, the position of the armature 4 at the time the armature 4 presses the piston member 5 is referred to as the "first position," and the position of the armature 4 at the time the armature 4 contacts the receiving portion 102c of the second housing member 102 is referred to as the "second position." The armature 4 thus advances and withdraws between the first position where the armature 4 presses the piston member 5 in the axial direction and the second position where the armature 4 does not to press the piston member 5, depending on whether the current is applied to the electromagnetic coil 31 or not. Rotation of the armature 4 relative to the second housing member 102 and the yoke 30 is restricted by the pins 33 inserted through the pin insertion holes 4b.

Figure 5:
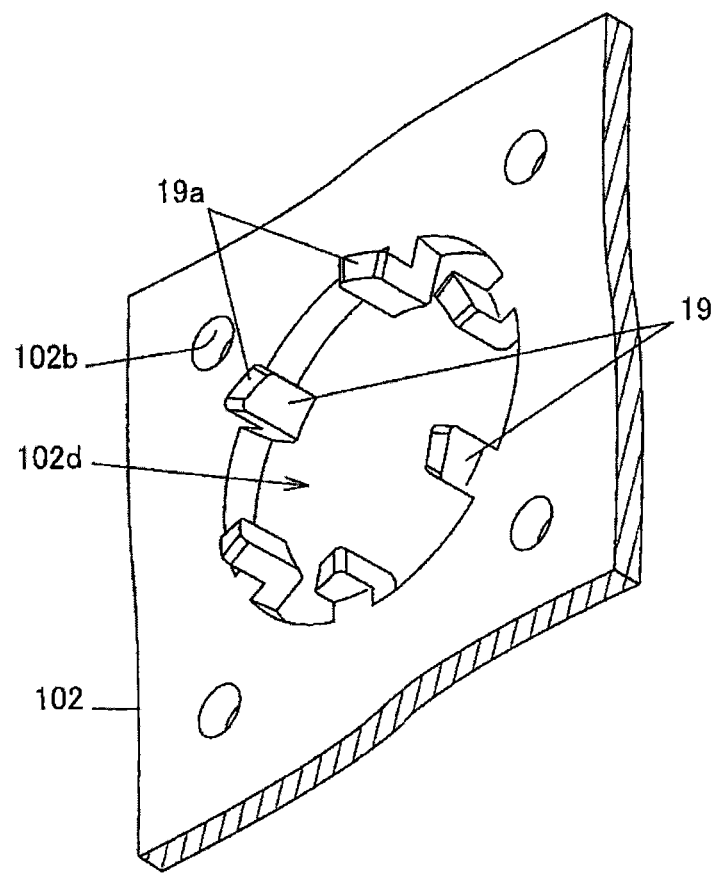
FIG. 5 is a perspective view showing a plurality of engaging members of a second housing.

FIG. 5 is a perspective view showing the engaging members 19 formed integrally with the second housing member 102. The second housing member 102 has a through hole 102d through which the second rotary member 12 is inserted. The engaging members 19 engage with one type of engaged portions among the engaged portions 51 to 56 of the piston member 5. The engaging members 19 protrude inward of the through hole 102d from the inner peripheral surface that defines the through hole 102d, and are extended toward the piston member 5 along the rotational axis O. Like the facing surfaces 41a of the pressing protrusions 41 of the armature 4, distal end faces 19a of the engaging members 19 which face the tilted surfaces 51a to 56a of the engaged portions 51 to 56 of the piston member 5 are tilted surfaces tilted with respect to the direction parallel to the rotational axis O. The engaging members 19 engage with one type of engaged portions among the engaged portions 51 to 56 according to advancement and withdrawal of the armature 4 between the first position and the second position.

The axial position of the base end face 5a of the piston member 5 with respect to the second rotary member 12 varies depending on which type of engaged portions among the first to sixth engaged portions 51 to 56 are engaged by the engaging members 19. The piston member 5 rotates by a predetermined angle as the armature 4 advances and withdraws. When the armature 4 makes one reciprocating motion according to application and non-application of a current to the electromagnetic coil 31, the engaged portion that is engaged by each engaging member 19 is shifted by one in the circumferential direction.

Figure 6:
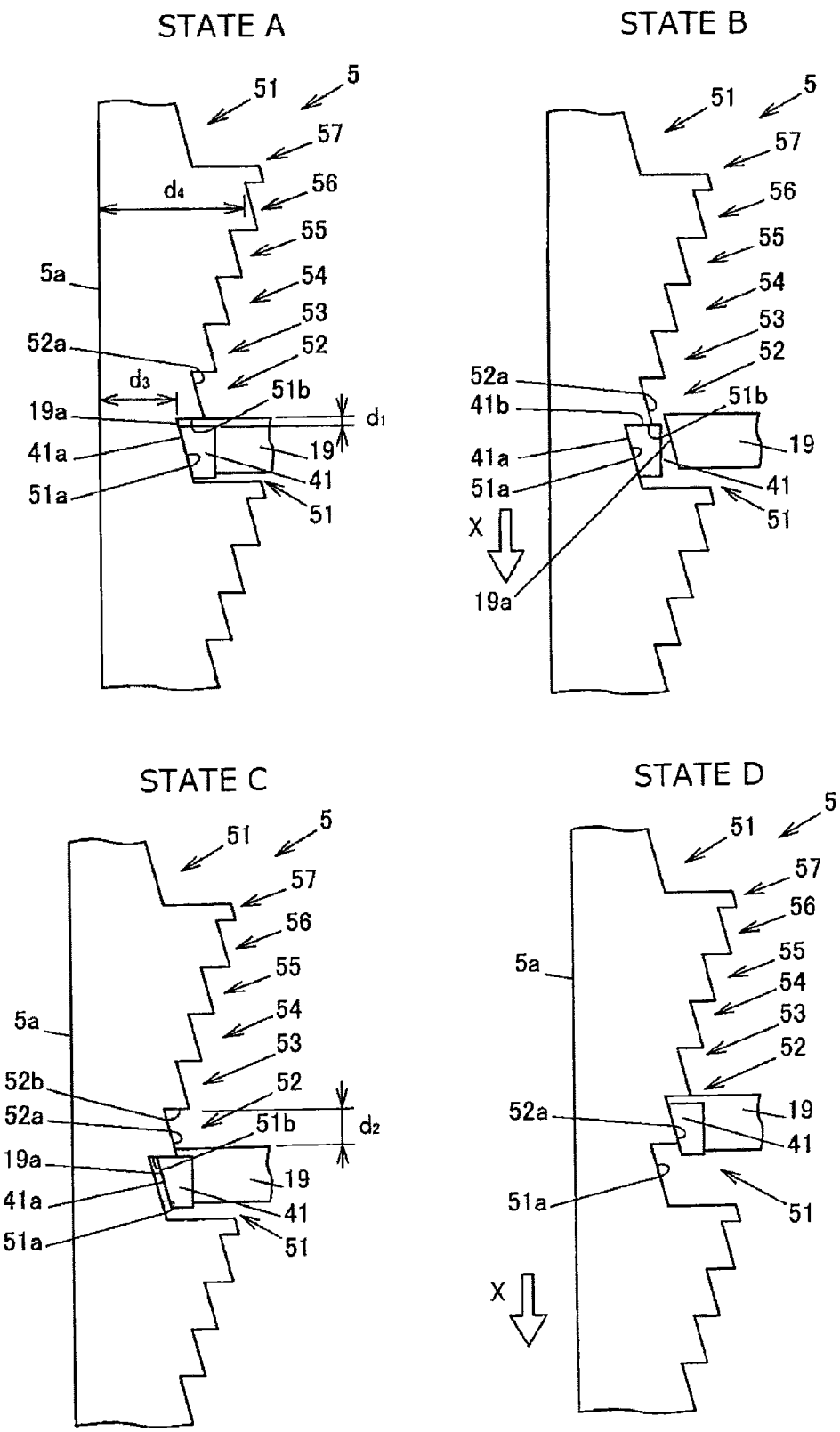
FIG. 6 shows schematic views illustrating operation of the piston member, the armature, and the engaging members.

States "A" to "D" of FIG. 6 schematically illustrate operation of the piston member 5, the armature 4, and the engaging member 19.

State A of FIG. 6 shows the state where the engaging member 19 engages with the first engaged portion 51 and the armature 4 is located at the second position. In this state, the tilted surface 51a of the first engaged portion 51 is pressed against the distal end face 19a of the engaging member 19 by the biasing force of the biasing mechanism 2, and faces the facing surface 41a of the pressing protrusion 41 of the armature 4. Clearance is provided between the pressing protrusion 41 and a side surface 51b of the first engaged portion 51 of the piston member 5. Namely, the pressing protrusion 41 is separated from the side surface 51b of the first engaged portion 51 of the piston member 5 by a distance $d_1$.

As shown in State B of FIG. 6, if a current is applied to the electromagnetic coil 31 in this state and the armature 4 moves to the first position, the tilted surface 51a of the first engaged portion 51 of the piston member 5 is pressed by the pressing protrusion 41, and the piston member 5 moves in the axial direction together with the armature 4. Moreover, the tilted surface 51a slides on the facing surface 41a of the pressing protrusion 41 due to the biasing force of the biasing mechanism 2 and rotates in the circumferential direction by a predetermined amount (distance $d_1$). At this time, a part of the distal end face 19a of the engaging member 19 faces the tilted surface 52a of the second engaged portion 52. That is, as the armature 4 moves to the first position, the armature 4 presses the tilted surface 51a of the first engaged portion 51 and the piston member 5 is rotated by the predetermined amount so that the tilted surface 52a of the second engaged portion 52 adjoining the first engaged portion 51 faces the engaging member 19.

State C of FIG. 6 shows the state where the application of the current to the electromagnetic coil 31 has been cut off and the armature 4 is returning from the first position to the second position. While the armature 4 is returning to the second position, the piston member 5 is subjected to the biasing force in the axial direction toward the armature 4 by the biasing mechanism 2 via the switch member 13 and the second friction member 16. The distal end face 19a of the engaging member 19 therefore contacts the tilted surface 52a of the second engaged portion 52. As the armature 4 further moves back to the second position, the tilted surface 52a of the second engaged portion 52 slides on the distal end face 19a of the engaging member 19 due to the biasing force of the biasing mechanism 2, and the piston member 5 thus further rotates in the circumferential direction by a distance $d_2$ shown in State C of FIG. 6 (the distance between the engaging member 19 and a side surface 52b of the second engaged portion 52). Accordingly, the engaging member 19 engages with the second engaged portion 52 of the piston member 5, as shown in State D of FIG. 6.

As described above, with application of a current to the electromagnetic coil 31, the armature 4 moves to the first position. When the application of the current is then cut off, the armature 4 returns to the second position. Thus, the tilted surface of the engaged portion slides on the distal end face 19a of the engaging member 19 due to the biasing force of the biasing mechanism 2, and the piston member 5 rotates accordingly. The engaging member 19 thus engages with the adjoining engaged portion.

As the engaging member 19 changes from the state where it engages with the first engaged portion 51 to the state where it engages with the sixth engaged portion 56, the piston member 5 is pressed toward the first rotary member 11. The distance by which the piston member 5 moves in the axial direction during this change of the state of the engaging member 19 corresponds to the difference between a distance $d_3$ between the base end face 5a of the piston member 5 and the first engaged portion 51, which is shown in State A of FIG. 6, and a distance $d_4$ between the base end face 5a and the sixth engaged portion 56, which is shown in State A of FIG. 6.

Figure 7:
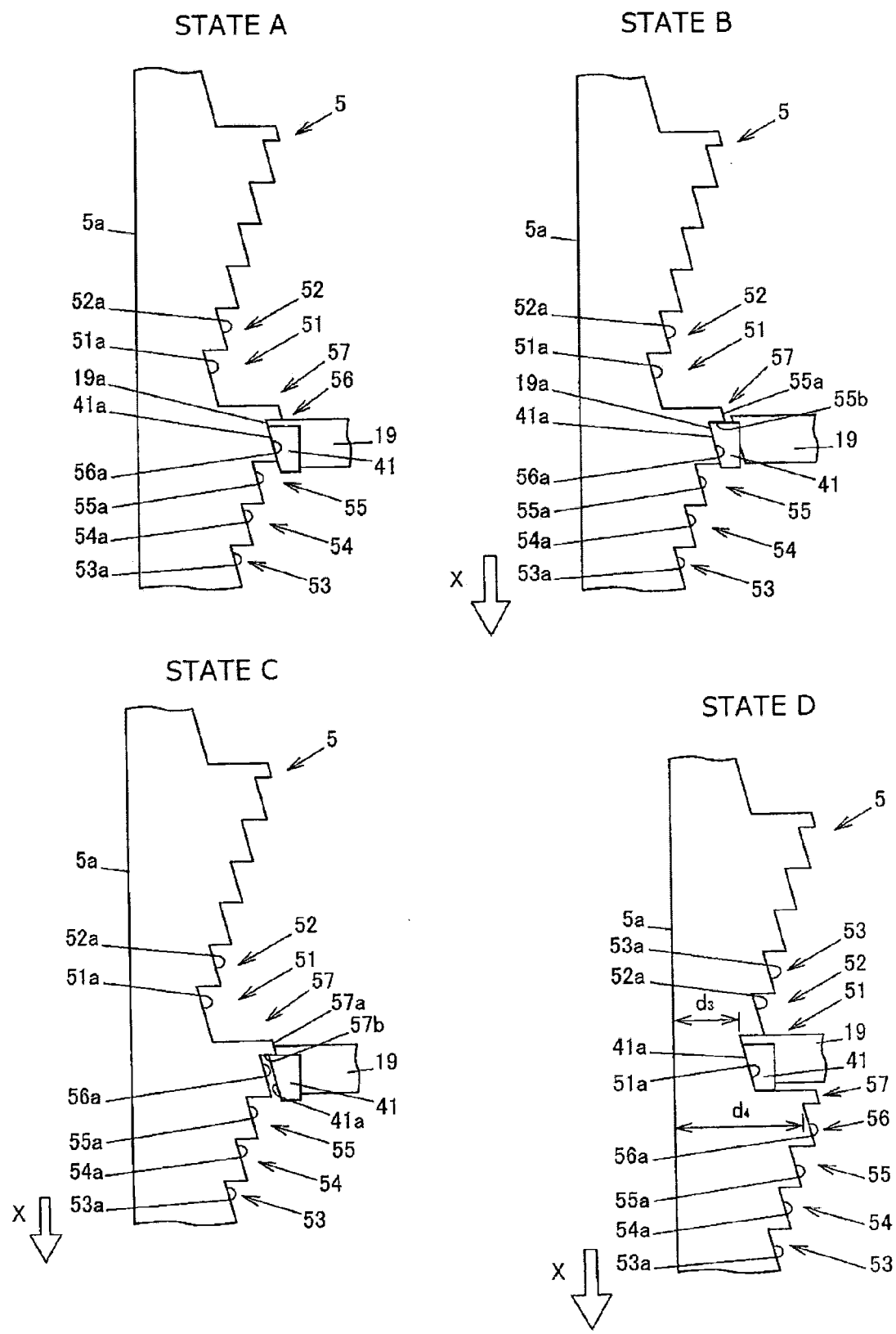
FIG. 7 shows schematic views illustrating operation of the piston member, the armature, and the engaging members when the driving force transmission device shifts from a decoupled state to a coupled state.

State A of FIG. 7 shows the state where the engaging member 19 engages with the sixth engaged portion 56 and the armature 4 is located at the second position. In this state, the engaging member 19 contacts the tilted surface 56a of the sixth engaged portion 56 and a circumferential side surface 57b of the wall portion 57.

State B of FIG. 7 shows the state where the armature 4 has moved to the first position from the state shown in State A of FIG. 7. While the armature 4 is moving from the second position to the first position, the pressing protrusion 41 presses the tilted surface 56a of the sixth engaged portion 56, and with this pressing operation, presses and moves the piston member 5 toward the switch member 13 and the second friction member 16. At this time, the engaging member 19 is separated from the circumferential side surface 57b of the wall portion 57. The piston member 5 thus rotates by a first predetermined angle in the direction shown by an arrow X.

When the piston member 5 is thus pressed and moved in the axial direction, the second friction member 16 is moved in the axial direction accordingly. The outer peripheral surface 162a of the rib portion 162 of the second friction member 16 is therefore brought into contact with the inner peripheral surface 142a of the rib portion 142 of the first friction member 14, generating a frictional force between the second friction member 16 and the first friction member 14. Accordingly, if the first rotary member 11 and the second rotary member 12 are rotating relative to each other with a difference in rotational speed therebetween, the difference in the number of revolutions between the first rotary member 11 and the second rotary member 12 gradually decreases due to the frictional force between the first and second friction members 14, 16. Rotation of the first rotary member 11 is thus synchronized with that of the second rotary member 12 by this frictional force.

State C of FIG. 7 shows the state where the armature 4 is returning to the second position from the state shown in State B of FIG. 7. In this state, the distal end face 19a of the engaging member 19 contacts an axial end face 57a of the wall portion 57 due to the biasing force applied from the biasing mechanism 2 in the axial direction toward the armature 4, and the piston member 5 is subjected to a rotational force in the direction shown by the arrow X. However, rotation of the piston member 5 in this direction is restricted as the pressing protrusion 41 of the armature 4 is in contact with the wall portion 57.

State D of FIG. 7 shows the state where the armature 4 has returned to the second position and the piston member 5 has rotated in the direction shown by the arrow X until the engaging member 19 engages with the first engaged portion 51. During the change from the state shown in State C of FIG. 7 to the state shown in State D of FIG. 7, the piston member 5 is shifted to a large extent in the axial direction by the distance corresponding to difference between the distances $d_3$, $d_4$ due to the biasing force of the biasing mechanism 2, and the switch member 13 and the second friction member 16 thus move in the axial direction accordingly. As a result, the outer peripheral surface 162a of the rib portion 162 of the second friction member 16 is separated from the inner peripheral surface 142a of the rib portion 142 of the first friction member 14, and the outer peripheral spline protrusions 13b of the switch member 13 engage with the inner peripheral spline protrusions 111a of the first rotary member 11.

As described above, when the engaging members 19 disengage from, among the first to sixth engaged portions 51 to 56, the sixth engaged portions 56 formed at the positions farthest from the switch member 13, and engage with the first engaged portions 51 formed at the positions closest to the switch member 13, the outer peripheral spline protrusions 13b of the switch member 13 engage with the inner peripheral spline protrusions 111a of the first rotary member 11 due to the biasing force of the biasing mechanism 2. The driving force transmission device 1 thus shifts to the coupled state where the first and second rotary members 11, 12 are coupled so that torque can be transmitted therebetween.

Operation of the biasing mechanism 2 at the time the driving force transmission device 1 shifts from the decoupled state to the coupled state will be described in detail with reference to FIGS. 8A to 8C.

Figure 8A:
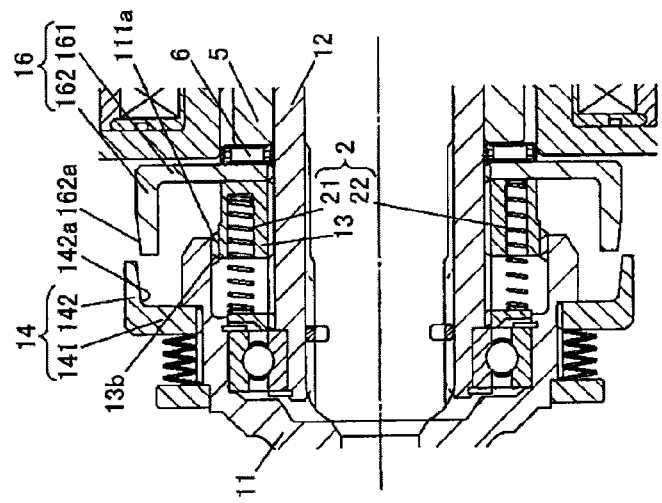
FIGS. 8A, 8B, and 8C are enlarged views of a main part of the driving force transmission device, illustrating operation of the switch member and a second friction member when the driving force transmission device shifts from the decoupled state to the coupled state.
Figure 8B:
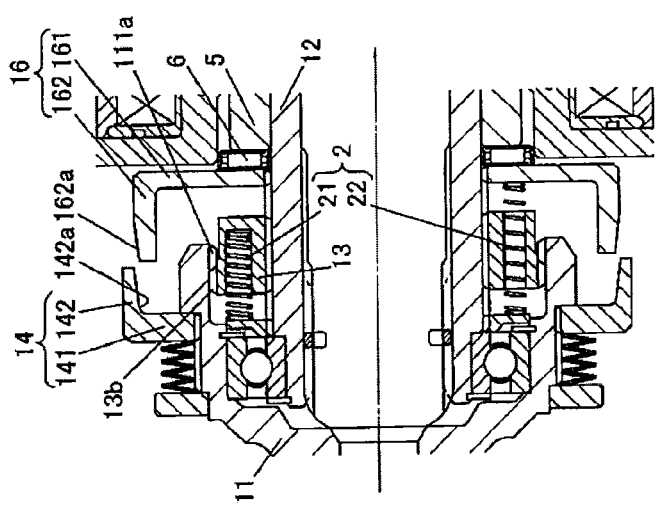
Figure 8C:
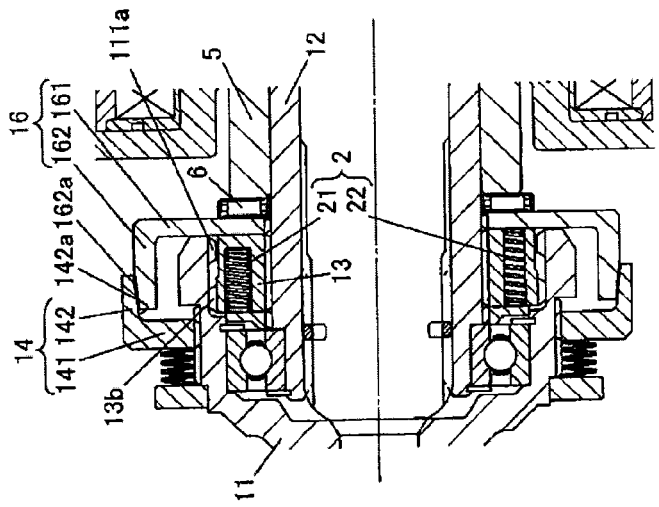

FIGS. 8A to 8C are illustrations showing an operation example in the case where the driving force transmission device 1 shifts from the decoupled state to the coupled state. FIG. 8A shows the synchronized state where rotation of the first rotary member 11 is synchronized with that of the second rotary member 12. FIG. 8B shows the state immediately before the switch member 13 is coupled to the first rotary member 11. FIG. 8C shows the state where the switch member 13 is coupled to the first rotary member 11.

In the state of FIG. 8A, the armature 4 moves to the first position and presses the tilted surfaces 56a of the sixth engaged portions 56 as shown in State B of FIG. 7. The second friction member 16 is subjected to this pressing force of the armature 4 via the piston member 5 and the needle roller bearing 6, and the outer peripheral surface 162a of the rib portion 162 of the second friction member 16 frictionally contacts the inner peripheral surface 142a of the rib portion 142 of the first friction member 14, thereby generating friction torque that synchronizes rotation of the first rotary member 11 with that of the second rotary member 12.

In this state, the piston member 5 is subjected to the biasing force of the first spring members 21 of the biasing mechanism 2 via the switch member 13, the second friction member 16, and the needle roller bearing 6, and is subjected to the biasing force of the second spring members 22 of the biasing mechanism 2 via the second friction member 16 and the needle roller bearing 6.

If application of a current to the electromagnetic coil 31 is cut off in the state of FIG. 8A and the armature 4 moves to the second position, the engaging members 19 engage with the first engaged portions 51, and the piston member 5 moves to a large extent in the axial direction due to the biasing force of the biasing mechanism 2. At this time, the switch member 13 and the second friction member 16 also move in the axial direction together with the piston member 5. However, the outer peripheral spline protrusions 13b of the switch member 13 may not immediately engage with the inner peripheral spline protrusions 111a of the first rotary member 11, and the axial end faces of the outer peripheral spline protrusions 13b of the switch member 13 may hit the axial end faces of the inner peripheral spline protrusions 111a of the first rotary member 11, as shown in FIG. 8B.

In this case, the switch member 13 stops moving toward the piston member 5, and the biasing force of the first spring members 21 is no longer transmitted to the piston member 5. In the present embodiment, however, since the second spring members 22 extend through the switch member 13 in the axial direction, the biasing force of the second spring members 22 is transmitted to the piston member 5 via the second friction member 16 and the needle roller bearing 6. The piston member 5 therefore continues to be subjected to the biasing force of the biasing mechanism 2 even if the axial movement of the switch member 13 due to the biasing force of the first spring members 21 is stopped by the contact between the axial end faces of the outer peripheral spline protrusions 13b of the switch member 13 and the axial end faces of the inner peripheral spline protrusions 111a of the first rotary member 11.

If the switch member 13 and the first rotary member 11 slightly rotate differentially in the state of FIG. 8B, and the outer peripheral spline protrusions 13b of the switch member 13 engage with the inner peripheral spline protrusions 111a of the first rotary member 11, the switch member 13 is allowed to move toward the piston member 5. The switch member 13 thus moves toward the piston member 5 and contacts the second friction member 16. Accordingly, the piston member 5 is subjected to the biasing force of the first spring members 21 of the biasing mechanism 2 via the switch member 13, the second friction member 16, and the needle roller bearing 6, and is subjected to the biasing force of the second spring members 22 of the biasing mechanism 2 via the second friction member 16 and the needle roller bearing 6.

The piston member 5 is thus always pressed toward the engaging members 19 by the biasing force of the biasing mechanism 2. More specifically, the piston member 5 is always subjected to the biasing force of at least one type of spring members of the first spring members 21 and the second spring members 22.

As described above, the piston member 5 is subjected to the biasing force of the biasing mechanism 2, and the tilted surfaces 51a to 56a of the first to sixth engaged portions 51 to 56 therefore slide and rotate on the facing surfaces 41a of the pressing protrusions 41 of the armature 4 and the distal end faces 19a of the engaging members 19. Since the piston member 5 is always subjected to the biasing force of the biasing mechanism 2, the operation of rotating the piston member 5 by the axial movement of the armature 4 can be stably performed.

In particular, in the present embodiment, even if the axial movement of the switch member 13 is stopped by the contact between the axial end faces of the outer peripheral spline protrusions 13b of the switch member 13 and the axial end faces of the inner peripheral spline protrusions 111a of the first rotary member 11, the piston member 5 is subjected to the biasing force of the second spring members 22 of the biasing mechanism 2. Accordingly, the piston member 5 is not allowed to rotate freely even during the change from the state shown in State B of FIG. 7 to the state shown in State D of FIG. 7, and the first engaged portions 51 can be reliably engaged by the engaging members 19.

The above embodiment has the following functions and advantageous effects.

(1) Since the piston member 5 is always pressed toward the engaging members 19 by the biasing force of the biasing mechanism 2, the operation of rotating the piston member 5 by the axial movement of the armature 4 can be stably performed.

(2) The biasing mechanism 2 has the first spring members 21 that bias the switch member 13 and the second spring members 22 that bias the second friction member 16, and the piston member 5 is always subjected to the biasing force of at least the second spring members 22 of the first and second spring members 21, 22. The second spring members 22 are fitted through the insertion holes 13d extending through the switch member 13 in the axial direction, and thus bias the second friction member 16. Accordingly, the biasing force of the biasing mechanism 2 can be always applied to the piston member 5 by using a simple configuration.

(3) The engaged portions (first to sixth engaged portions 51 to 56) of the piston member 5 are formed in the shape of a staircase in the circumferential direction. This can increase the stroke of the switch member 13 and the second friction member 16 which move in the axial direction together with the piston member 5. Rotation of the first rotary member 11 can thus be synchronized with that of the second rotary member 12 by the frictional sliding between the second friction member 16 and the first friction member 14, and the first and second rotary members 11, 12 can be switched between the coupled state and the decoupled state by the switch member 13.

Although the present invention is described above based on the embodiment, the present invention is not limited to the above embodiment, and can be carried out in various forms without departing from the spirit and scope of the invention. For example, the above embodiment is described with respect to the case where the piston member 5 has six sets of the first to sixth engaged portions 51 to 56. However, the number of sets of the first to sixth engaged portions 51 to 56 is not limited to six. The piston member 5 need only have a plurality of sets of the first to sixth engaged portions 51 to 56. The number of engaged portions in each set (the number of steps in the staircase shape) is not limited. However, the number of steps is desirably three or more in order to ensure the axial stroke of the switch member 13 and the second friction member 16.

What is claimed is:

1. A driving force transmission device, comprising:
   a first rotary member and a second rotary member which can rotate relative to each other;
   a switch member that can switch the first rotary member and the second rotary member between a coupled state and a decoupled state by moving in an axial direction;
   a friction member that generates a frictional force suppressing differential rotation between the first and second rotary members, by moving in the axial direction;
   a cylindrical piston member that has a plurality of engaged portions formed in a shape of a staircase in a circumferential direction, and that can press the switch member and the friction member toward one side in the axial direction;
   a pressing member that is disposed so as to face the engaged portions of the piston member in the axial direction, and that advances and withdraws between a first position where the pressing member presses the piston member in the axial direction and a second position where the pressing member does not press the piston member;
   a biasing mechanism that presses the switch member and the friction member toward the piston member; and
   an engaging member that engages with one of the plurality of engaged portions; wherein
   the engaged portions of the piston member have a tilted surface tilted with respect to the circumferential direction of the piston member,
   by moving to the first position, the pressing member presses the tilted surface of the engaged portion and rotates the piston member by a predetermined amount to cause a tilted surface of another one of the engaged portions which adjoins the engaged portion to face the engaging member,
   when the pressing member returns to the second position, the tilted surface of the another engaged portion slides on the engaging member due to a biasing force of the biasing mechanism, and the piston member thus further rotates, whereby the engaging member engages with the another engaged portion, and
   the piston member is always pressed toward the engaging member by the biasing force of the biasing mechanism.

2. The driving force transmission device according to claim 1, wherein
   the biasing mechanism has a first spring member that biases the switch member toward the piston member, and a second spring member that biases the friction member toward the piston member, and
   the piston member is always subjected to a biasing force of at least one of the first and second spring members.

3. The driving force transmission device according to claim 2, wherein
   the switch member is disposed such that a part of the friction member is interposed between the switch member and the piston member, and
   the second spring member is fitted through an insertion hole extending through the switch member in the axial direction, and biases the friction member.

* * * * *